UNITED STATES PATENT OFFICE.

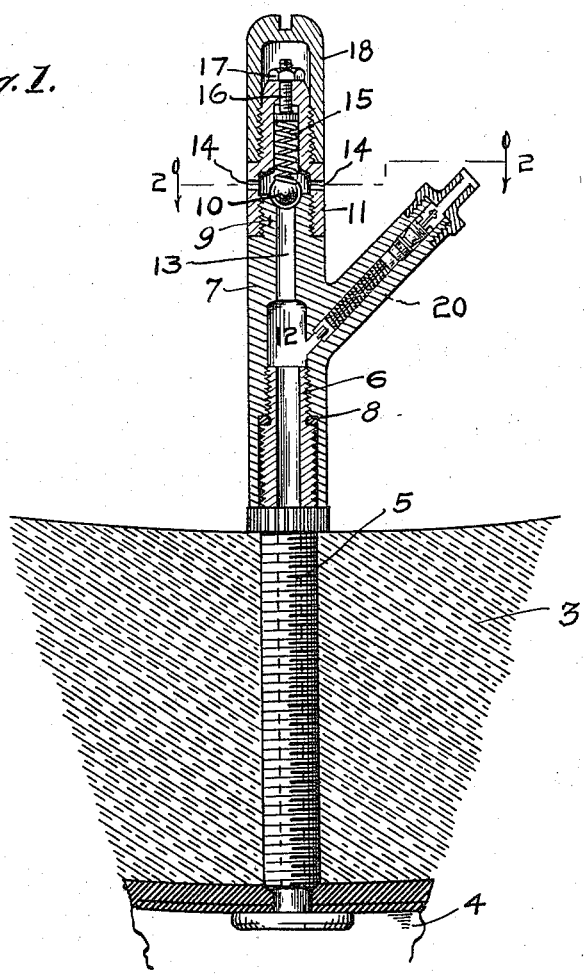

ANDREW L. OWENS AND CHARLES L. ALFORD, OF INDIANAPOLIS, INDIANA; SAID ALFORD ASSIGNOR TO SAID OWENS.

RELIEF-VALVE FOR PNEUMATIC TIRES.

1,144,499.

Specification of Letters Patent.

Patented June 29, 1915.

Application filed August 29, 1914. Serial No. 859,184.

*To all whom it may concern:*

Be it known that we, ANDREW L. OWENS and CHARLES L. ALFORD, citizens of the United States, residing at Indianapolis, in the county of Marion and State of Indiana, have invented certain new and useful Improvements in Relief-Valves for Pneumatic Tires, of which the following is a specification.

In the use of pneumatic vehicle tires on racing and other cars going at a high rate of speed whereby heat from excessive friction is generated, and, also, on cars running over heated pavements and roadways in hot weather, the air with which the tires are inflated is frequently expanded to such an extent as to cause the bursting of the tires, and the object of our invention is to provide a relief valve which will automatically open above a predetermined pressure of air within a tire and remove the excess pressure by allowing the contained air to escape which will obviate the danger of the bursting of the tire from excess inflation.

A further object of the invention is to provide a relief valve which can be readily adjusted to operate at different air pressures from within the tire, and also to provide means for filling the tire with air without interfering with the operations of the relief valve so that the latter will positively avoid the danger of excess inflation at the initial charging of the tire, as well as afterward.

We accomplish the above, and other objects which will hereinafter appear, by the mechanism illustrated in the accompanying drawing, in which—

Figure 1 is a longitudinal vertical section of our invention as applied to a pneumatic vehicle tire, and Fig. 2 is a transverse section on the line 2—2 of Fig. 1.

Like characters of reference indicate like parts throughout the two views of the drawing.

Referring to the drawing, 3 represents the wheel-rim and 4 the inner tube of a pneumatic tire.

5 is the nipple of usual construction extending from the inner tube to and through the rim 3, and projecting inwardly of the rim. It terminates with a screw-threaded end 6 of reduced diameter upon which the body-member 7 of our improved relief valve is screwed in the manner shown in Fig. 1. A gasket 8 is interposed between the shoulders between nipple 5 and body 7 to insure an air-tight joint between said parts. A reduced end 9 of the body-member 7 has a seat to receive a ball-valve 10, and it is externally screw-threaded to receive the internally threaded end of a body-extension 11.

The body-member 7 is hollow to form the chamber 12 which communicates with the conduit through the nipple 5, and the ball-valve 10 when in its seat in the end of the extension 9 closes a reduced channel 13 extending from the chamber 12 longitudinally of the body-member. The socket in the body-extension 11 which receives the reduced extension 9 is deeper than the length of the latter so as to provide a valve chamber for the operations of the valve 10, and the unobstructed circulation of air around the latter when open. Passages 14, to atmosphere, are formed through the body-extension 11, from said valve-chamber whereby air admitted to the latter by the opening of the valve will discharge to atmosphere.

The ball-valve 10 is seated by a spirally wound spring 15, located in a socket for that purpose provided in the body-extension 11. A head on a screw-threaded bolt 16 bears against the spring 15. The end of the bolt projects beyond the body-extension 11 by passing through a correspondingly threaded opening in the latter. The end of the bolt is notched to receive a screw-driver for adjusting it to regulate the pressure of the spring 15 against the ball 10, and a given adjustment of the bolt is retained by a nut 17. A cap 18 is screwed upon the reduced end of the extension 11 to prevent accidental movement of the bolt 16 and nut 17.

A branch passage communicates obliquely through an arm 20 with the chamber 12. Through this oblique branch passage air for inflating the tire is introduced in the usual manner. Within the passage is a valve of usual construction and operation, as shown in Fig. 1, which need not be described in detail here.

In the operation of our invention, which may be installed by screwing the old valve off and replacing it with ours on the nipple 5, the tension of the spring 15 is regulated by the bolt 16 to cause the ball-valve 10 to open under any desired pressure of air within the tire. The number of pounds pressure at which the valve 10 is set to open can readily be measured by the pressure gage which is part of the tire inflating equipment to be found at any of the garages or air-supplying stations commonly distributed throughout the country. When the valve 10 is thus set to open at a safe pressure for the tire such opening and relief will occur whenever the air expansion from heat causes the pressure of the air within the tire to exceed that limit, and such action will so continue as to remove the possibility of danger from tire explosion. When the temperature conditions are reversed the slightly deflated tire can be pumped up again. The filling of the tire through the oblique passage and arm 20 does not interfere with the operation of the relief valve which latter is always ready to make over-inflation impossible.

While we have described our invention with more or less minuteness as regards details of construction and arrangement and as being embodied in certain precise forms, we do not desire to be limited thereto unduly or any more than is pointed out in the claims. On the contrary, we contemplate all proper changes in form, construction and arrangement, the omission of immaterial elements, and the substitution of equivalents as circumstances may suggest or necessity render expedient.

We claim:

In a relief valve for pneumatic tires, a hollow body member assembled radially of the wheel and terminating with an inner valve-seated threaded end, a valve-closed air-passage discharging into the hollow of said body between said valve-seat and the base of the body, a body extension having a threaded end-recess in which the threaded valve-seated end of the body is screwed, a valve on said recessed end of the body-extension smaller than the recess to provide circulatory passages between it and the recessed walls, a spring seated in a reduced extension of the recess and guided against the valve by the walls of the extension, and means for regulating the pressure of the spring against the valve.

In witness whereof, we have hereunto set our hands and seals at Indianapolis, Indiana, this 17th day of August, A. D. one thousand nine hundred and fourteen.

ANDREW L. OWENS. [L. S.]
CHARLES L. ALFORD. [L. S.]

Witnesses:
J. A. MINTURN,
I. L. LARSON.